April 12, 1955 J. KNIVETON 2,706,111
METAL MELTING FURNACE
Filed March 25, 1952 2 Sheets-Sheet 1

*INVENTOR.*
JAMES KNIVETON
BY
ATTORNEY.

April 12, 1955   J. KNIVETON   2,706,111
METAL MELTING FURNACE
Filed March 25, 1952   2 Sheets-Sheet 2

*INVENTOR.*
JAMES KNIVETON
BY
ATTORNEY.

2,706,111

METAL MELTING FURNACE

James Kniveton, Wyncote, Pa., assignor to Selas Corporation of America, Philadelphia, Pa., a corporation of Pennsylvania Application March 25, 1952, Serial No. 278,369

1 Claim. (Cl. 266—40)

The present invention relates to furnaces, and more particularly to a furnace for melting metals such as aluminum, magnesium, bronze and the like.

It is an object of the invention to provide a furnace having separate parts thereof in which the metal is melted and in which the molten metal is held at temperature for use. It is a further object of the invention to provide a furnace in which it is possible to control closely and individually the temperature of the melting metal and of the metal that has been melted.

It is a further object of the invention to provide a furnace having a pair of pots or crucibles in one of which metal is melted and in the other of which molten metal is kept at temperature for use, and with a connecting passage between said pots or crucibles.

In accordance with the present invention there is provided a furnace having two compartments, each of which is individually heated and controlled. A crucible or pot is placed in each compartment and the crucibles are connected so that molten metal can flow from one to the other. In some cases, it is possible to use a single crucible that is divided into separate sections by a suitable partition with the crucible so positioned in the furnace that one section is in each furnace compartment. In either case, the metal to be melted is placed in one of the crucibles or pots. As the metal is melted, it flows to the other crucible or pot where it is held at temperature until it is used. In this manner, the dirt and slag that is accumulated during the melting process is kept away from the supply of metal that is to be used. Furthermore, the temperature of the molten metal is not subjected to changes as additional ingots are added to be melted.

The various features of novelty which characterize my invention are pointed out with particularity in the claim annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
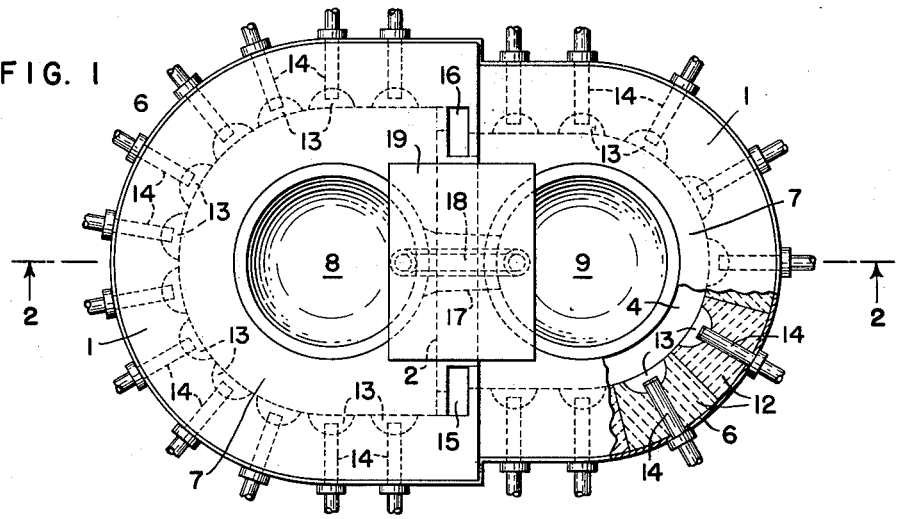
Figure 1 is a top view, partly in section, of the furnace.
Figure 2:
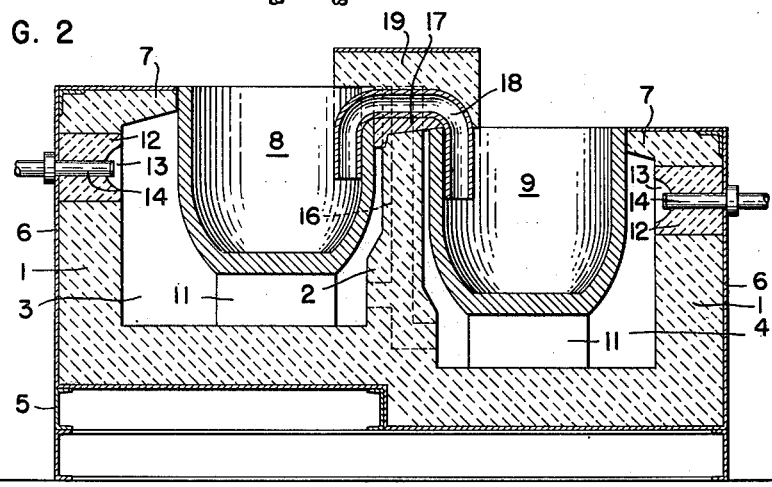
Figure 2 is a section taken on line 2—2 of Figure 1.

There is shown in Figures 1 and 2 of the drawing a furnace 1 that is provided with a floor and side walls and which is also provided with a wall 2 extending transversely of the same. This wall divides the furnace into a heating chamber 3 and a holding chamber 4. The furnace may be built in accordance with accepted furnace construction practice, either of brick or of a poured refractory which is capable of withstanding the required temperatures. Also, in accordance with standard furnace practice, the furnace is re-enforced by structural steel members 5 and the refractory is backed up with sheet metal work 6.

The upper edge of the furnace around the chambers 3 and 4 is provided with an overhanging ledge 7 that is of a size to receive in the chamber 3 a melting pot or crucible 8 and in the chamber 4, at a lower level, a holding pot or crucible 9. These pots or crucibles are mounted on abutments 11 of suitable refractory material. The arrangement is such that the upper edges of the melting and holding pots are at substantially the same height as the top of the furnace, and the pots are snugly received in ledges 7 so that there will be practically no loss of heat around the edges of the pots.

Each of the chambers 3 and 4 is heated by a plurality of burners 12 that are embedded in the wall of the furnace. Preferably, and as shown herein, these burners are of a type disclosed in Hess Patent 2,215,079 issued September 20, 1940. Each of these burners comprises a refractory block that is provided on its face with a cup shaped depression 13 facing the interior of the furnace chamber. Fuel is supplied through a distributing member 14 to the cup where it is discharged in a plurality of substantially radially directed jets to be burned along the surface of the cup. The cup is thereby heated to incandescence to supply radiant heat to the pot which is located in front thereof. Heat is also supplied to the chamber of the furnace by the hot products of combustion that are released in the chamber. Each of the burners supplying heat to the chamber 3 is connected by a suitable manifold, not shown, with a source of supply of a combustible mixture of gas and air. The manifold supplying the burners is not shown, since manifolds of this type are conventional in the furnace art. The temperature of the furnace chamber 3 and, therefore, the melting pot 8 can be controlled in a conventional manner in order to maintain the temperature of the pot constant at the desired value.

The chamber 4 is heated in exactly the same manner as the chamber 3 with all of the burners in that chamber connected to a common manifold (not shown) which is separate from the manifold supplying the burners in chamber 3. The supply of fuel to this second mentioned manifold may also be controlled automatically in a conventional manner to maintain constant and at some desired value the temperature of the metal in pot 9. The products of combustion from each of the chambers are removed through a pair of flues 15 and 16 that are formed in the transversely extending wall 2. The lower end of each of these flues is connected by a suitable passage with each chamber.

The pot 8 has a spout like member 17 projecting from the side thereof across the partition 2 and over the edge of pot 9. A U-shaped tube 18 of refractory material rests on the spout with its ends extending into the respective pots about midway of their depth. Molten metal flows through the tube from pot 8 to pot 9. A cover 19 is provided to protect and insulate the tube 18.

It is noted that the pots 8 and 9 may be made of any suitable material depending upon the metal that is being melted. In some cases, these pots, as well as the spout 17 and tube 18, will be made of a ceramic material such as silicon carbide, and in other cases they can be made of metal such as cast iron. The particular material that is used for the pots will depend to a large extent upon the metal that is being melted and upon the practice of the foundry in which the furnace is used.

In the operation of a furnace of the type shown herein, metal in the form of ingots or scrap is placed in the pot 8. This pot, by the heat of the burners, is raised to a temperature sufficient to melt the metal. As additional metal is placed in the pot 8, the level of the melted metal therein will rise so that it can flow through the tube 8 to the pot 9 where it is held at the desired temperature. Metal is ladled from the pot 9 when needed for casting purposes. At noted above, the holding pot 9 is at a slightly lower level than the melting pot 8. This arrangement permits molten metal to flow through the tube 18 with the action of a siphon, so that there is no danger of the pot 8 overflowing as new metal is added thereto.

The arrangement shown herein in which the metal is melted in one pot and flows to the other due to natural forces when additional metal is added to the melting pot, has numerous advantages. As is well known in foundry practices, as a new ingot is added to the melting pot, the metal therein is chilled so that a period of time is required for the temperature to stabilize before further casting can take place. With the arrangement of this application, molten metal flows from the melting pot into a holding pot which can be kept at a constant temperature at all times. Another advantage of the present construction is that the dirt and slag which normally accumulates when metal is melted is not transferred to the holding pot from which metal is removed for casting. Slag can rise to the surface of pot 8, whereas the heavier impurities will sink to the bottom. The metal transferred from the melting pot to the holding pot is removed from the center portion of the pot where it is purest.

It is noted that the burners 12 are placed in the furnace in such a position that they are directed toward the upper portion of the pots. This arrangement insures that the more intense heat is adjacent to the upper portion of the pot where the heat losses are the greatest. Thus, the temperature of the metal near the surface of the pots where ingots are dropped and where the metal is removed will be held at a more even temperature. Furthermore, after the furnace has been shut down and started again, the location of the burners insures that melting will begin in the upper portion of the pot and thereby prevent breakage of the pot, which frequently occurs when heat is applied to the bottom thereof. The products of combustion flowing around the bottoms of the pots to the flues serve to heat the lower portions thereof. It is noted that the flues 15 and 16 in wall 2 serve to maintain the temperature of this wall at a high value to assist in maintaining the pots at a uniform temperature.

Figures 3, 4:
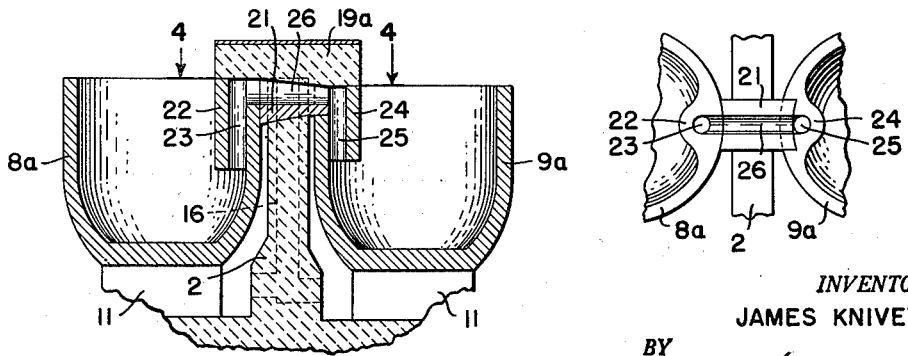
Figure 3 is a section through the furnace showing a modified form of holding and melting crucible.
Figure 4 is a top view of a portion of Figure 3 taken on line 4—4 of that figure.

The arrangement shown in Figures 3 and 4 differs from that described above in the form of the melting and holding pots. In this case, the melting pot 8a is provided with an enlargement 22 through which a passage 23 is formed. In a like manner, the pot 9a is provided with an enlargement 24 through which a passage 25 is formed. The upper ends of these passages are connected by a channel shaped member 26 which is formed of the same material as the pots and which is preferably made integrally the pot 8a. The channel 26 will be covered by member 19a similar to the cover 19 described above, which cover will fit closely over the channel to insulate and protect it. In the operation of a furnace with pots of this type, the flow of metal from pot 8a to the pot 9a is due entirely to gravity rather than to gravity and a siphon action. As new metal is added to pot 8a, the level of the liquid metal therein will be raised so that the metal in passage 23 can flow across the channel 26 into passage 25 and pot 9a. Otherwise, the operation is exactly the same as that described in connection with Figures 1 and 2.

Figure 5:
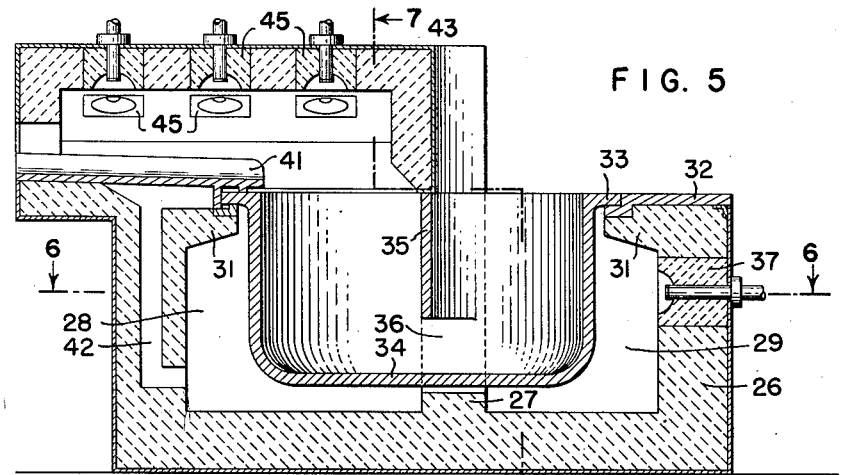
Figure 5 is a section view through a different form of the furnace.
Figure 6:
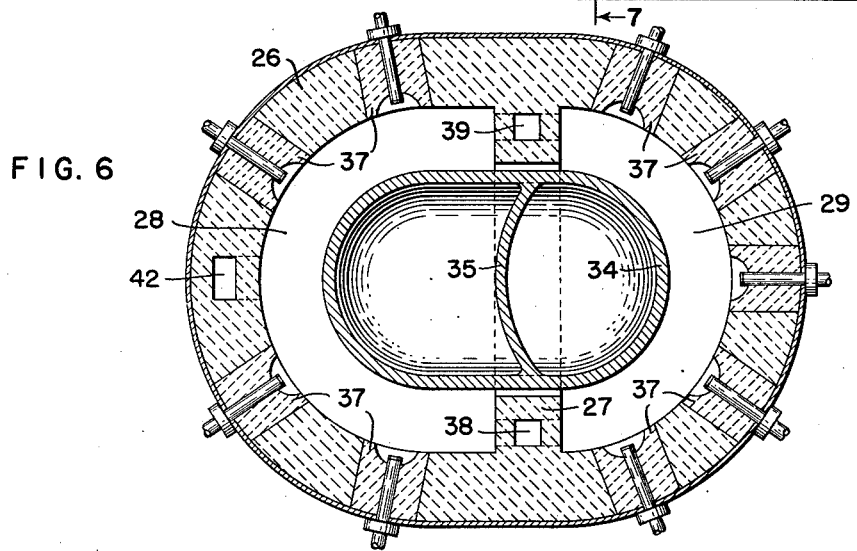
Figure 6 is a section taken on line 6—6 of Figure 5.
Figure 7:
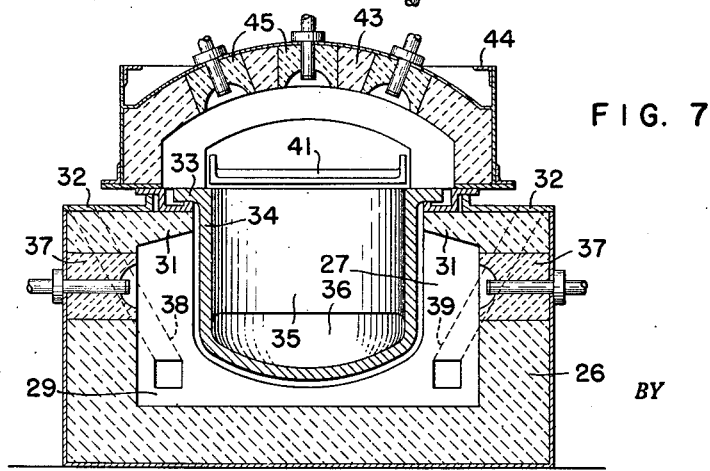
Figure 7 is a section taken on line 7—7 of Figure 5.

Another form that the invention can take is shown in Figures 5 to 7. In these figures, the furnace 26 is substantially the shape of that in Figures 1 and 2. The furnace is divided by a U-shaped wall 27 into a melting chamber 28 and a holding chamber 29. This furnace, like the others previously described, is built in accordance with standard furnace construction practices. The upper portion of the furnace chambers are provided with an inwardly extending ledge 31 that is covered throughout its extent by a metal top plate 32. This plate is provided with a flange around its inner edge that is adapted to receive an outwardly extending flange 33 of a combination melting and holding pot 34.

In this case, the melting and holding pots are formed as a single unit with the melting and holding sections thereof separated from each other by a partition 35 which extends from the top of the pot to a point adjacent to the bottom thereof. The lower edge of the partition and the bottom of the pot form a passage 36 through which the molten metal can flow from the melting to the holding side thereof.

This furnace is also heated by burners 37 of the radiant cup type described above. In this case, also, the burners on the holding chamber end of the furnace are to be fired and controlled together, while the burners on the melting end of the furnace are to be fired and controlled together and independently of those in the other chamber. With this arrangement, the melting section and the holding section of the pot are in effect separate pots and can have their temperatures controlled in such a fashion that they are substantially independent, so that the metal in the holding section of the pot is maintained at a substantially constant temperature. There is provided in each of the upstanding portions of the U-shaped wall 27 a flue indicated at 38 and 39 respectively. Each of the flues is connected by a suitable passage with the holding chamber and with the melting chamber, so that the products of combustion can be withdrawn from the lower portion of these chambers and exhausted to the atmosphere.

In this form of the invention, there is provided a hearth 41 upon which ingots can be placed to be moved into the melting portion of the pot. This hearth can be heated to a certain extent by products of combustion which impinge against the lower surface thereof as they rise from the melting section of the furnace through a flue 42 that is formed in the end wall. The gases in the flue 42 are discharged through suitable ports, not shown, on each side of the hearth. Over the hearth and the melting portion of the pot, there is provided a roof 43 which is constructed of a refractory material that is backed up by reenforcing structural members 44. This roof is provided with burners 45 so that the material moving along the hearth toward the melting portion of the pot will be preheated. The roof also serves to prevent a substantial amount of heat loss from the pot itself. It is intended that the burners in the roof are to be supplied with a fuel mixture from a common manifold in a conventional manner and are to be fired independently of the burners in the furnace. The roof may be removed by merely lifting it from the position shown so that access may be obtained to the melting pot for cleaning and repair if necessary.

From the above, it will be seen that I have devised a melting and holding furnace which is so arranged that variations in the temperature of the melting metal will have no effect upon the temperature of the molten metal that is being held until it is ladled out for casting or other purposes. Furthermore, the metal in the holding pot will be free from the dirt normally encountered in metal melting furnaces.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention, as set forth in the appended claim, and that in some cases certain features of my invention may be used to advantage without a corresponding use of other features.

What is claimed is:

Melting apparatus for metal comprising in combination a furnace structure forming a pair of side by side chambers completely separated by a partition extending between them, one of said chambers being at an elevation slightly higher than the other, said structure being provided with a pair of openings in the top thereof, each opening communicating with a chamber, a pot for receiving metal extending through each opening into one of said chambers, means in the bottom of each chamber to hold the top of the pot received therein flush with the opening through which it extends with one pot being at a higher level than the other, the pots being of a size to be received snugly in the openings, burner means individual to each chamber and being located adjacent to the top thereof to heat individually the chamber in which it is located and the pot contained therein, said structure being formed with a flue adjacent to the bottom of each chamber through which products of combustion from the burner means may be withdrawn, and means to transfer metal from substantially the mid-point in the height of the pot on the higher level to the pot on the lower level.

References Cited in the file of this patent

UNITED STATES PATENTS

| | | |
|---|---|---|
| 307,845 | Curtis | Nov. 11, 1884 |
| 814,769 | Cline | Mar. 13, 1906 |
| 1,522,765 | Wilke | Jan. 13, 1925 |
| 1,672,142 | Rabate | June 5, 1928 |
| 1,710,234 | Nelson | Apr. 23, 1928 |
| 1,886,937 | Brett | Nov. 8, 1932 |
| 1,983,580 | Nock | Dec. 11, 1934 |
| 2,509,079 | Trewin | May 23, 1950 |

FOREIGN PATENTS

| | | |
|---|---|---|
| 437,170 | Germany | Nov. 16, 1926 |
| 594,640 | France | June 27, 1925 |
| 902,997 | France | Jan. 5, 1945 |